(12) United States Patent
DePottey et al.

(10) Patent No.: US 7,118,128 B2
(45) Date of Patent: Oct. 10, 2006

(54) LOW LEAKAGE AIRBAG MODULE

(75) Inventors: Timothy A. DePottey, Flint, MI (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 331 days.

(21) Appl. No.: 10/694,078

(22) Filed: Oct. 27, 2003

(65) Prior Publication Data

US 2005/0087967 A1 Apr. 28, 2005

(51) Int. Cl.
*B60R 21/26* (2006.01)
(52) U.S. Cl. .......................... 280/740; 280/732
(58) Field of Classification Search ................ 280/740, 280/732
See application file for complete search history.

(56) References Cited

U.S. PATENT DOCUMENTS

| | | | |
|---|---|---|---|
| 5,320,379 A | 6/1994 | Burnard et al. | |
| 5,470,100 A | 11/1995 | Gordon | |
| 5,547,213 A | 8/1996 | Lang et al. | |
| 5,560,642 A | 10/1996 | Davidson et al. | |
| 5,566,973 A | 10/1996 | Green et al. | |
| 5,577,763 A | 11/1996 | Cuevas | |
| 5,620,200 A | 4/1997 | Garner et al. | |
| 5,639,112 A | 6/1997 | Phillion et al. | |
| 5,992,874 A * | 11/1999 | Sugiyama et al. | 280/728.2 |
| 6,029,996 A * | 2/2000 | Yoshioka et al. | 280/740 |
| 6,109,649 A * | 8/2000 | Adomeit et al. | 280/740 |
| 6,120,055 A | 9/2000 | Cuevas et al. | |
| 6,120,057 A | 9/2000 | Adomeit et al. | |
| 6,145,872 A | 11/2000 | Soderquist et al. | |
| 6,345,837 B1 | 2/2002 | Warnez et al. | |
| 6,422,600 B1 * | 7/2002 | Crohn et al. | 280/740 |
| 6,485,053 B1 | 11/2002 | Fujimoto et al. | |
| 6,494,483 B1 * | 12/2002 | Floersheimer et al. | 280/740 |
| 6,846,014 B1 * | 1/2005 | Rink et al. | 280/740 |
| 2001/0033075 A1 * | 10/2001 | Soderquist et al. | 280/736 |
| 2001/0048216 A1 * | 12/2001 | Varcus et al. | 280/728.2 |
| 2004/0004345 A1 * | 1/2004 | Kayser | 280/740 |
| 2004/0256846 A1 * | 12/2004 | Kahler et al. | 280/740 |
| 2005/0073139 A1 * | 4/2005 | Fischer et al. | 280/740 |
| 2005/0082793 A1 * | 4/2005 | Lee | 280/728.2 |
| 2005/0093279 A1 * | 5/2005 | Hauer et al. | 280/740 |

FOREIGN PATENT DOCUMENTS

| | | |
|---|---|---|
| DE | 195 38 594 | 4/1997 |
| EP | 1 106 446 | 6/2001 |
| JP | 2001-10435 | 1/2001 |
| WO | WO-02/14117 | 2/2002 |

* cited by examiner

*Primary Examiner*—Paul N. Dickson
*Assistant Examiner*—Barry Gooden, Jr.

(57) ABSTRACT

An airbag module for installation in a motor vehicle is disclosed. In an exemplary embodiment, the airbag module includes an airbag cushion. A diffuser is positioned inside the airbag cushion. The diffuser includes a diffuser panel that has a plurality of venting apertures disposed throughout. An inflator is provided for inflating the airbag cushion. The inflator includes an inflation gas dissemination portion that releases inflation gases upon activation of the inflator. The inflator is attached to the diffuser in such a way that the inflation gas dissemination portion of the inflator is located inside the airbag cushion.

30 Claims, 5 Drawing Sheets

LOW LEAKAGE AIRBAG MODULE

BACKGROUND OF THE INVENTION

1. Field of the Invention

The present invention relates to systems and apparatus for protecting vehicle occupants from injury. More specifically, the present invention relates to an airbag module that is designed to reduce the leakage of inflation gases during inflation of the airbag cushion.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

In the event of an accident, a sensor system within the vehicle senses an impact situation and triggers the ignition of an inflator. Inflation gases from the inflator fill one or more airbag cushions, which immediately inflate to protect the driver and/or passengers from impact against the interior surfaces of the vehicle. During normal vehicle operation, airbags are typically stowed behind covers to protect them from tampering and provide a more attractive interior facade for the vehicle.

One type of known airbag module includes a diffuser that is positioned inside the airbag cushion. A typical diffuser includes a diffuser panel that includes a plurality of venting apertures. A single layer of the airbag cushion is spread across the top side of the diffuser panel, while the remainder of the airbag cushion is folded underneath the diffuser panel. The inflator is typically attached to the diffuser. When the inflator discharges, the inflation gases released by the inflator travel through the venting apertures in the diffuser panel, thereby increasing the pressure in that region and effectively "pushing" the layer that is spread over the top side of the diffuser panel away from the diffuser panel. Such movement of the top layer of the airbag cushion causes the rest of the airbag cushion to be "pulled" out of the diffuser and into its inflated position.

An airbag module that employs a diffuser in the manner described possesses several advantages over other types of airbag modules. For example, the airbag cushion generally possesses a larger surface area while it is inflating than in other designs. In addition, the amount of breakout force that is required is generally less than in other designs.

Unfortunately, however, known airbag modules that include a diffuser are typically prone to leakage of inflation gases. Such leakage generally occurs at the point of attachment between the inflator and the diffuser, although leakage may also occur through other similar attachment joints. Accordingly, benefits may be realized by an airbag module that includes a diffuser, as described, but that is designed to reduce the amount of leakage that occurs during inflation of the airbag cushion.

SUMMARY OF THE INVENTION

The apparatus of the present invention has been developed in response to the present state of the art, and in particular, in response to the problems and needs in the art that have not yet been fully solved by currently available airbag modules. Thus, it is an overall objective of the present invention to provide an airbag module that remedies the shortcomings of the prior art.

To achieve the foregoing objective, and in accordance with the invention as embodied and broadly described herein in one embodiment, an airbag module includes an airbag cushion. A diffuser is positioned inside the airbag cushion. The diffuser includes a diffuser panel that has a plurality of venting apertures disposed throughout. The shape of the diffuser panel may conform to the shape of a dashboard in the vehicle. An inflator is attached to the diffuser in such a way that at least a portion of the inflator is located inside the airbag cushion.

The inflator includes an inflation gas dissemination portion that releases inflation gases upon activation of the inflator. The inflation gas dissemination portion of the inflator may be the portion of the inflator that is located inside the airbag cushion. In some embodiments, the inflator is attached to the diffuser in such a way that the line of gas flow between the inflation gas dissemination portion of the inflator and the airbag cushion does not include an attachment joint (i.e., a point where two components of the airbag module are attached to one another).

Typically, only a single layer of the airbag cushion is spread across a first side of the diffuser panel. The airbag module also includes a housing that is attached to the diffuser. A folded portion of the airbag cushion is situated between a second side of the diffuser panel and the housing. The diffuser panel may include a plurality of snap lines that break upon activation of the inflator, thereby allowing the folded portion of the airbag cushion to exit the diffuser as the airbag cushion inflates.

The airbag cushion includes a mouth for receiving the portion of the inflator that is located inside the airbag cushion. In some embodiments, the mouth of the airbag cushion is substantially smaller than the diffuser panel. The diffuser may include an inflator chamber that is attached to a bottom side of the diffuser panel. The inflator chamber may include an inflator hole that is substantially aligned with the mouth of the airbag cushion. The inflator may be attached to the diffuser in such a way that the inflation gas dissemination portion of the inflator extends through the mouth of the airbag cushion and the inflator hole in the inflator chamber so that the inflation gas dissemination portion of the inflator is located inside the airbag cushion.

Through the use of the airbag modules of the present invention, leakage of inflation gases during inflation of the airbag cushion may be reduced. Furthermore, the overall effectiveness of airbag modules may be improved by increasing the efficiency of the airbag deployment. These and other features and advantages of the present invention will become more fully apparent from the following description and appended claims, or may be learned by the practice of the invention as set forth hereinafter.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "one embodiment" or "an embodiment" means that a particular feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of airbag cushions, inflators, sensor mechanisms, etc., to provide a thorough understanding of certain embodiments of the invention. One skilled in the art will recognize, however, that the invention can be practiced without one or more of the specific details, or with other components, materials, etc. In other instances, well-known structures, materials, or operations are not shown or described in detail to avoid obscuring aspects of the invention.

The embodiments disclosed herein are described in relation to a passenger side airbag. However, those skilled in the art will recognize that the present invention is equally applicable to other types of airbags, such as knee bolsters, overhead airbags, inflatable curtains, inflatable structural stiffeners, and so forth.

As used herein, the phrase "attached to" refers to a form of mechanical coupling that restricts relative translation or rotation between the attached objects. However, two objects that are attached to one another need not be directly touching.

Figure 1:
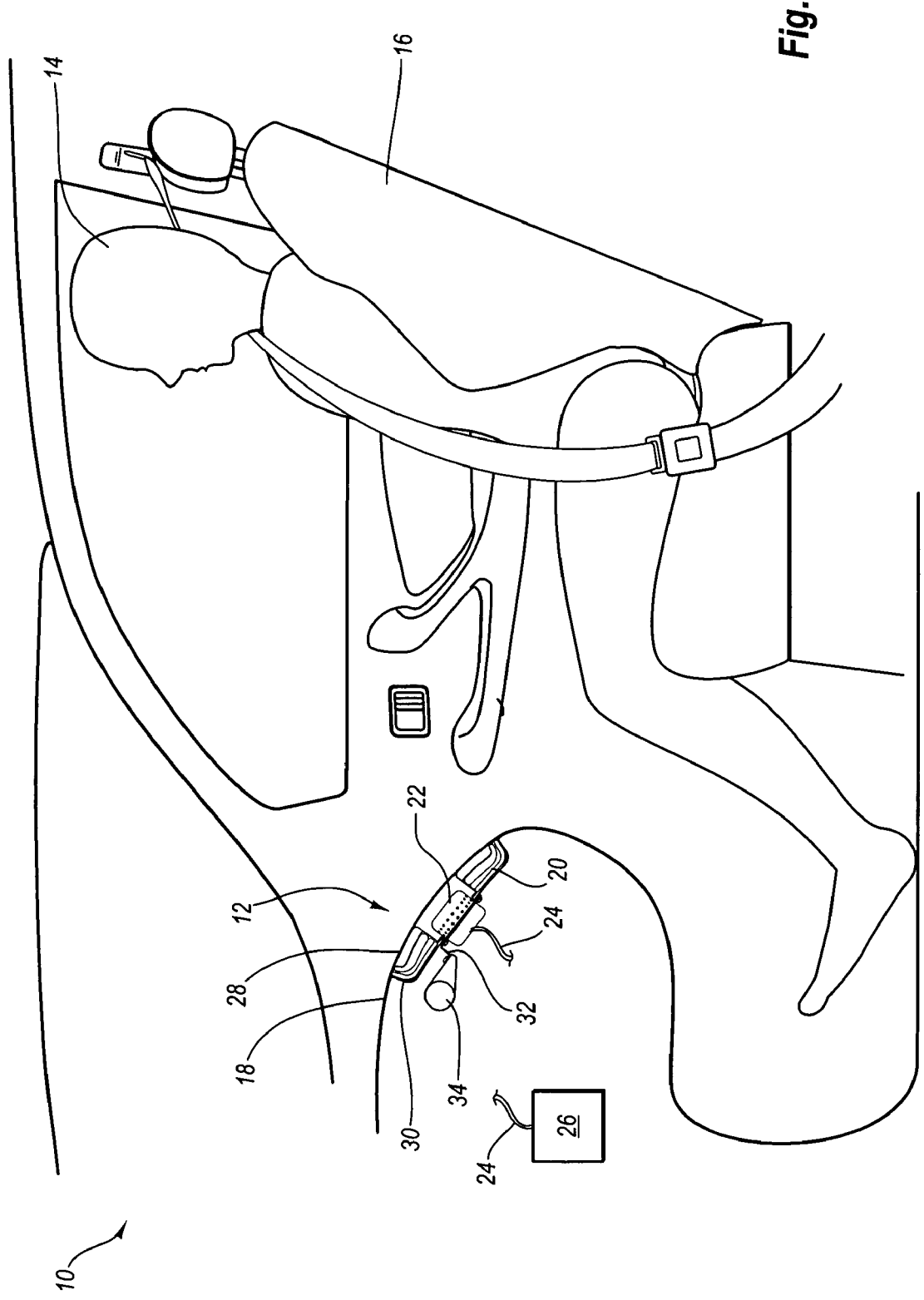
FIG. 1 is a side cutaway view of an interior portion of a motor vehicle having an embodiment of an airbag module installed therein.

FIG. 1 is a side cutaway view of an interior portion of a motor vehicle 10 having an embodiment of an airbag module 12 installed therein. A vehicle occupant 14 is shown seated in a front seat 16 of the vehicle 10. A dashboard 18 is located in front of the front seat 16. The airbag module 12 is installed behind the dashboard 18.

The airbag module 12 includes an airbag cushion 20. The airbag cushion 20 is capable of inflating in order to protect the occupant 14 from impact with the dashboard 18 in the event of a collision involving the vehicle 10. The airbag cushion 20 is typically constructed from a woven fabric, such as nylon, in order to provide the airbag cushion 20 with a "gas-tight" construction.

An inflator 22 is provided for inflating the airbag cushion 20. The inflator 22 is typically a pyrotechnic device that uses the combustion of gas-generating material to generate inflation gases that inflate the airbag cushion 20. The inflator 22 shown in FIG. 1 is commonly referred to as a disk inflator 22. However, other types of inflators 22 are known to those skilled in the art and may be used in alternative embodiments of the invention.

Lead wires 24 extend from the inflator 22 and may be used to place the inflator 22 in electrical communication with a sensor mechanism 26. The sensor mechanism 26 is configured to detect a collision involving the motor vehicle 10 and provide an electrical signal that is indicative thereof. Many different types of sensor mechanisms 26 are known to those skilled in the art and may be used in connection with embodiments of the invention. One example of a sensor mechanism 26 is an electronic accelerometer. Another example of a sensor mechanism 26 is an electro-mechanical device that completes an electrical circuit upon detection of sudden deceleration of the motor vehicle 10. Other exemplary sensor mechanisms 26 may employ radar, lidar, ultrasonic sound waves, optical microwaves, or the like.

A diffuser 28 is positioned inside the airbag cushion 20. The inflator 22 is attached to the diffuser 28. When the inflator 22 discharges, the diffuser 28 helps to disseminate the inflation gases to the airbag cushion 20. The diffuser 28 will be described in greater detail below.

The airbag module 12 also includes a housing 30 and a mounting bracket 32. The housing 30 holds the airbag cushion 20 in place and protects it. The mounting bracket 32 facilitates attachment of the airbag module 12 to a structural portion 34 of the vehicle 10, such as a cross-car beam 34.

Figure 2:
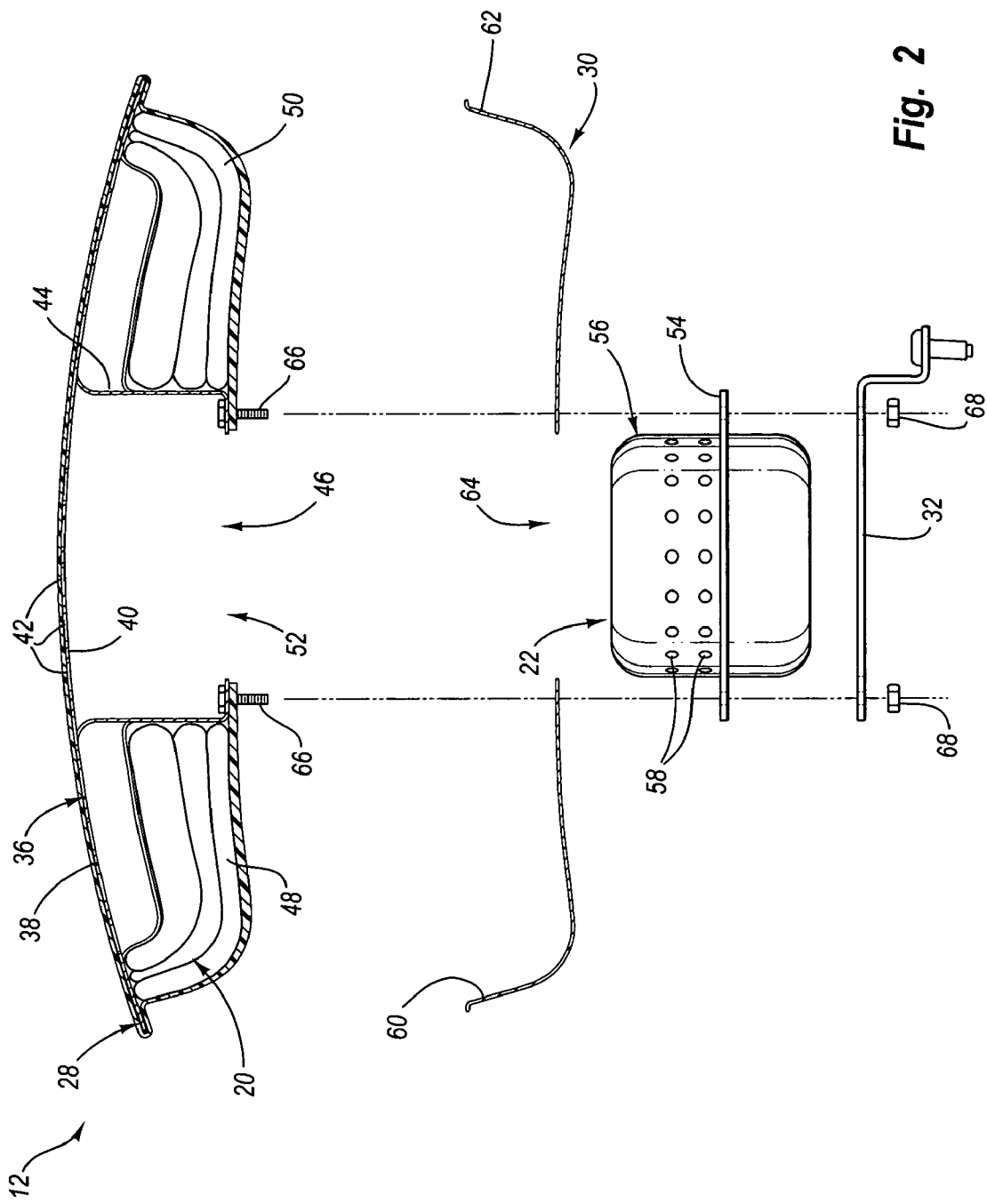
FIG. 2 is an exploded, cross-sectional view of the airbag module shown in FIG. 1.

FIG. 2 is an exploded, perspective view of the airbag module 12 shown in FIG. 1. The diffuser 28 is shown positioned inside the airbag cushion 20. The diffuser 28 includes a diffuser panel 36 having a top side 38 and a bottom side 40. The diffuser panel 36 is curved, so as to conform to the shape of the dashboard 18. A plurality of venting apertures 42 are disposed in the diffuser panel 36. An inflator chamber 44 is attached to the bottom side of the diffuser panel 36. The inflator chamber 44 includes an inflator hole 46 that is dimensioned so that at least a portion of the inflator 22 may be inserted through it.

A single layer of the airbag cushion 20 is spread across the top side 38 of the diffuser panel 36, while the remainder of the airbag cushion 20 is folded underneath the bottom side 40 of the diffuser panel 36. A first folded portion 48 of the airbag cushion 20 is situated to one side of the inflator chamber 44, while a second folded portion 50 of the airbag cushion 20 is situated to the other side of the inflator chamber 44. The airbag cushion 20 also includes a mouth 52 for receiving an inflator 22. The mouth 52 is substantially aligned with the inflator hole 46 in the inflator chamber 44.

In the illustrated embodiment, the diffuser 28 is too large to fit through the mouth 52 in the airbag cushion 20. Thus, to position the diffuser 28 inside the airbag cushion 20, the cushion 20 is typically provided with another opening (not shown) that is larger than the mouth 52. Once the diffuser 28 has been inserted into the airbag cushion 20, this larger opening may be stitched closed. Alternatively, the diffuser 28 may be sewn into the airbag cushion 20 during assembly of the cushion 20.

The inflator 22 is also shown in FIG. 2. An attachment plate 54 extends circumferentially around the inflator 22 and enables the inflator 22 to be attached to the inflator chamber 44 within the diffuser 28. The inflator 22 includes a gas dissemination portion 56 that is disposed above the attachment plate 54. The gas dissemination portion 56 includes a plurality of diffuser holes 58 from which inflation gases are released once the inflator 22 has discharged.

The housing 30, mounting bracket 32, and fasteners for attaching the various components together are also shown in FIG. 2. The housing 30 includes a first end portion 60, a second end portion 62, and an inflator hole 64 that is dimensioned so that at least a portion of the inflator 22 may be inserted through it. The mounting bracket 32 is configured so that it may be placed around the inflator 22 and moved into abutting relation with the attachment plate 54. The fasteners include a pair of male studs 66 and corresponding washers 68.

Figure 3:
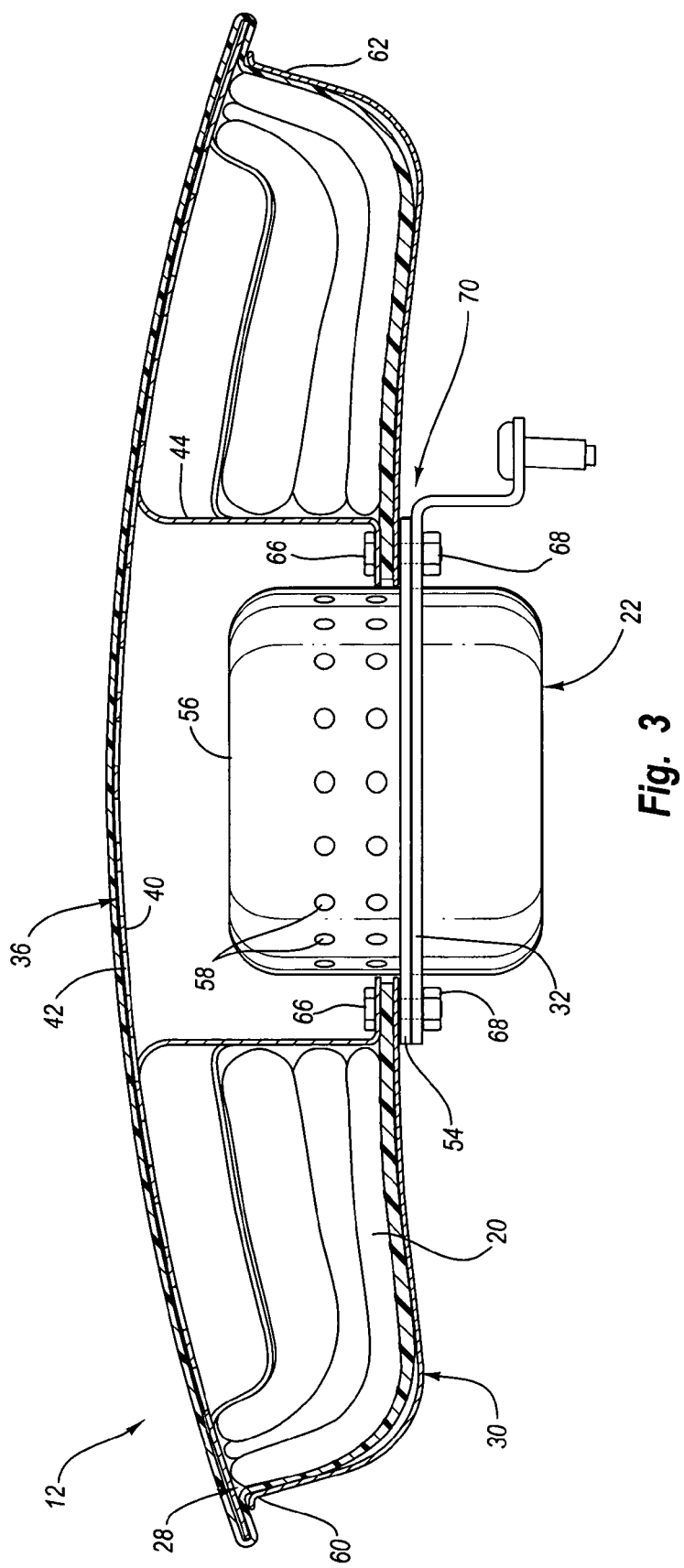
FIG. 3 is a cross-sectional view of the airbag module of FIGS. 1–2 in its assembled configuration.

FIG. 3 is a cross-sectional view of the airbag module 12 of FIG. 2 in its assembled configuration. The first end portion 60 of the housing 30 presses a first portion of the airbag cushion 20 against one end of the bottom side 40 of the diffuser panel 36, while the second end portion 62 of the housing 30 presses a second portion of the airbag cushion 20 against the other end of the bottom side 40 of the diffuser panel 36. The remainder of the housing 30 is positioned so that the mouth 52 (not visible in FIG. 3) of the airbag cushion 20 is substantially aligned with and situated between the inflator hole 46 (not visible in FIG. 3) in the inflator chamber 44 and the inflator hole 64 (not visible in FIG. 3) in the housing 30. In this position, the housing 30 protects the airbag cushion 20 and retains it in place.

The inflator 22 is situated so that the gas dissemination portion 56 of the inflator 22 is located inside the airbag cushion 20. More specifically, the gas dissemination portion 56 of the inflator 22 extends into the inflator chamber 44 of the diffuser 28 which, as discussed above, is positioned inside the airbag cushion 20. The attachment plate 54 on the inflator 22 is in contact with the housing 30, while the mounting bracket 32 is in contact with the attachment plate 54. The male studs 66 and corresponding washers 68 are used to attach the inflator chamber 44, the airbag cushion 20, the housing 30, the attachment plate 54, and the mounting bracket 32 to one another.

Advantageously, the configuration shown in FIG. 3 is generally less prone to leakage of inflation gases than known airbag modules that employ a diffuser 28. One reason for this is that the gas dissemination portion 56 of the inflator 22 is positioned inside the airbag cushion 20. In this way, inflation gases may be released into the airbag cushion 20 past any areas of the airbag module 12 that are not completely gas-tight, such as attachment joints 70 (i.e., points in the airbag module 12 where two or more components are connected). In the illustrated embodiment, there is an attachment joint 70 between the diffuser 28 and the inflator 22, namely, the point where the attachment plate 54 on the inflator 22 is attached to the inflator chamber 44 on the diffuser 28. As shown in FIG. 3, this attachment joint 70 is not positioned in the line of gas flow between the gas dissemination portion 56 of the inflator 22 and the airbag cushion 20. Therefore, when the inflator 22 discharges, inflation gases are released into the airbag cushion 20 without flowing past this attachment joint 70. This generally reduces the amount of leakage that occurs.

Another reason why the airbag module 12 is generally less prone to leakage of inflation gases is that the mouth 52 of the airbag cushion 20 is substantially smaller than in known airbag modules that employ a diffuser 28. As best seen in FIG. 2, in the airbag module 12 shown in FIG. 3, the mouth 52 of the airbag cushion 20 is substantially smaller than the diffuser panel 36. However, in known airbag modules that employ a diffuser, the mouth of the airbag cushion is substantially the same size as the diffuser panel.

In the embodiment shown in FIG. 3, the housing 30 is placed into position before the inflator 22 is placed into position. Therefore, in the fully assembled configuration of the airbag module 12, the portion of the airbag cushion 20 that surrounds the mouth 52 is situated between the inflator chamber 44 and the housing 30. Alternatively, the inflator 22 may be placed into position before the housing 30 is placed into position, so that in the fully assembled configuration of the airbag module 12 the portion of the airbag cushion 20 that surrounds the mouth 52 is situated between the inflator chamber 44 and the attachment plate 54 on the inflator 22.

Figure 4:
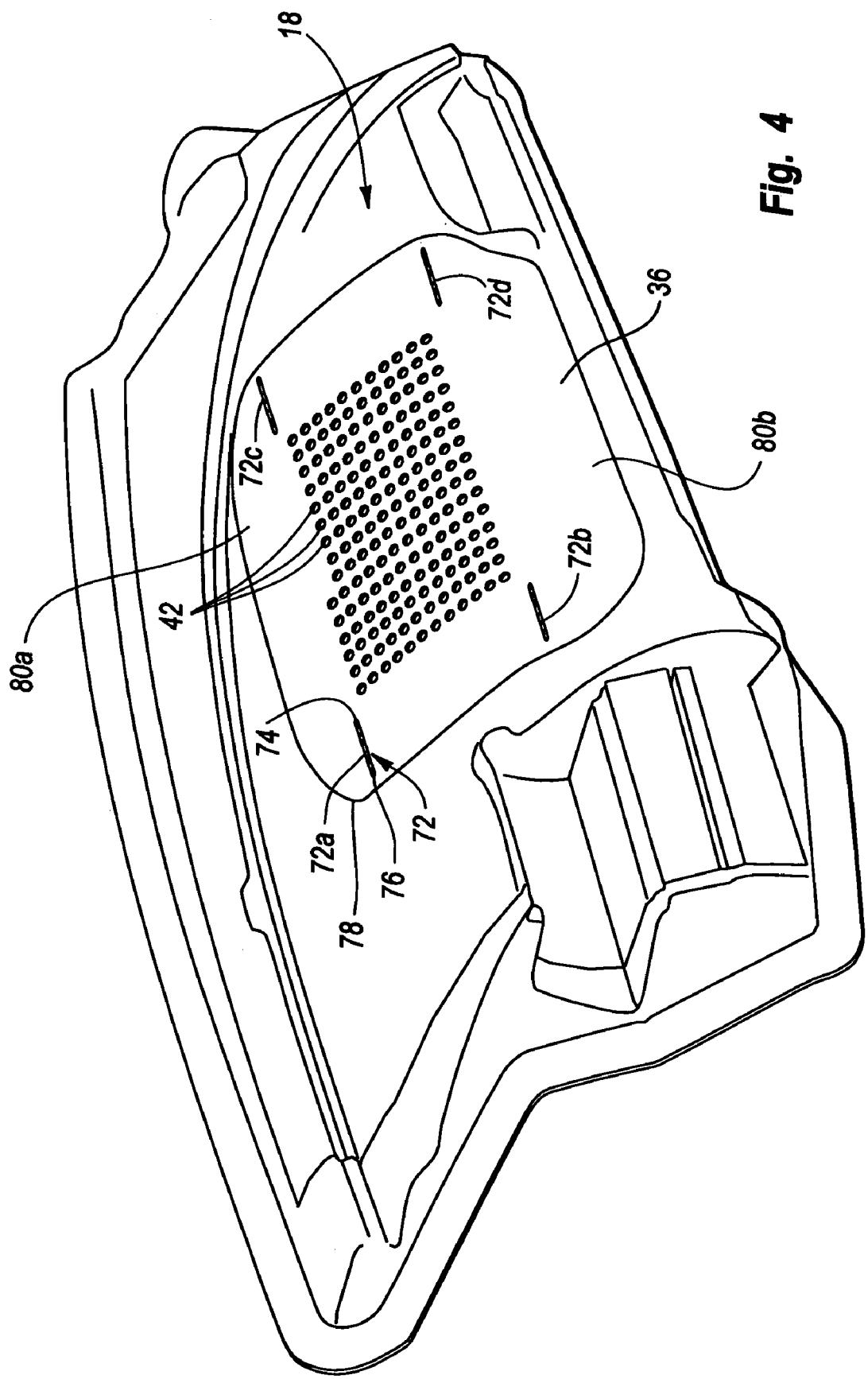
FIG. 4 is a partial cut-away, perspective view of the dashboard of the vehicle of FIG. 1.

FIG. 4 is a partial cut-away, perspective view of the dashboard 18 of the vehicle 10 of FIG. 1. A portion of the dashboard 18 and the top layer of the airbag cushion 20 have been cut away so as to reveal the diffuser panel 36 in the airbag module 12.

As shown, the venting apertures 42 in the diffuser panel 36 are arranged in a substantially rectangular pattern. A plurality of snap lines 72, or slits 72, are positioned in the diffuser panel 36 around the array of venting apertures 42. More specifically, an upper left snap line 72a is positioned in the upper left corner of the diffuser panel 36, a lower left snap line 72b is positioned in the lower left corner of the diffuser panel 36, an upper right snap line 72c is positioned in the upper right corner of the diffuser panel 36, and a lower right snap line 72d is positioned in the lower right corner of the diffuser panel 36.

Each snap line 72 extends from an interior point 74 located near the array of venting apertures 42 to a peripheral point 76 located just inside the edge 78 of the diffuser panel 36. During inflation of the airbag cushion 20, the snap lines 72 "break." In other words, the force applied by the inflating airbag cushion 20 causes the peripheral point 76 of the snap line 72 to separate from the edge 78 of the diffuser panel 36, so that the snap lines 72 become fully extended all the way to the edge 78 of the diffuser panel 36.

Once the snap lines 72 have broken, a pair of foldable sections 80 are formed in the diffuser panel 36. The first foldable section 80a consists of the region of the diffuser panel 36 between the upper left snap line 72a and the lower left snap line 72b, while the second foldable section 80b consists of the region of the diffuser panel 36 between the upper right snap line 72c and the lower right snap line 72d. The force applied by the inflating airbag cushion 20 causes the foldable sections 80 to fold upward and point away from the diffuser panel 36.

Figure 5:
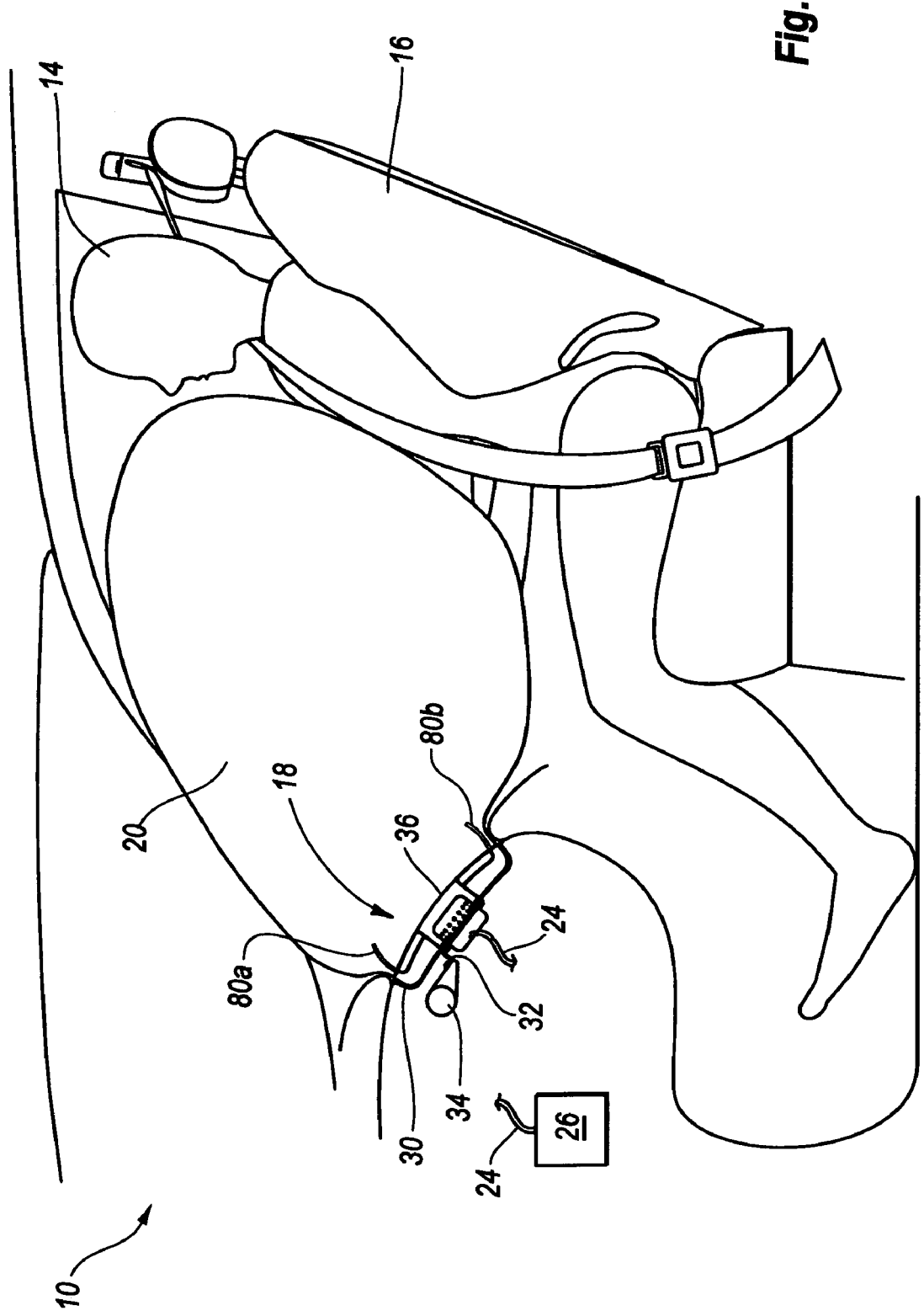
FIG. 5 is a side cutaway view of the interior portion of the vehicle of FIG. 1 with the airbag cushion shown in its inflated configuration.

FIG. 5 is a side cutaway view of the interior portion of the vehicle 10 of FIG. 1 with the airbag cushion 20 shown in its inflated configuration. The foldable sections 80 on the diffuser panel 36 have folded upward and are shown pointing away from the diffuser panel 36. In its inflated configuration, the airbag cushion 20 is in position to protect the upper body of the vehicle occupant 14.

Referring to FIGS. 1 through 5 collectively, the operation of the airbag module 12 will be described. When the sensor mechanism 26 detects a collision involving the vehicle 10, it provides an electrical signal to the inflator 22. In response, the inflator 22 discharges, thereby releasing inflation gases into the airbag cushion 20 through the diffuser holes 58 in the gas dissemination portion 56 of the inflator 22. As discussed previously, the airbag module 12 is generally less prone to leakage of inflation gases than known airbag modules that employ a diffuser.

Some of the inflation gases released by the inflator 22 travel through the venting apertures 42 in the diffuser panel 36, thereby increasing the pressure in that region and effectively "pushing" the top layer of the airbag cushion 20 (i.e., the layer that is spread over the top side 38 of the diffuser panel 36) away from the diffuser panel 36. Such movement of the top layer of the airbag cushion 20 causes the rest of the airbag cushion 20 to be pulled toward the diffuser panel 36, so that the first folded portion 48 of the airbag cushion 20 exerts a force against the first foldable section 80a in the diffuser panel 36 and the second folded portion 50 of the airbag cushion 20 exerts a force against the second foldable section 80b in the diffuser panel 36. In response, the first foldable section 80a and the second foldable section 80b fold up, permitting the rest of the airbag cushion 20 to exit the diffuser 28 as the airbag cushion 20 continues to inflate. At some point during inflation, the airbag cushion 20 breaks through the dashboard 18 and continues to inflate until it is fully inflated and generally positioned as shown in FIG. 5.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag module for installation in a vehicle, comprising:
   an airbag cushion;
   a diffuser positioned inside the airbag cushion, the diffuser comprising a diffuser panel with a plurality of venting apertures disposed therein; and
   an inflator attached to the diffuser, wherein at least a portion of the inflator is located inside the airbag cushion, wherein the diffuser panel comprises a plurality of snap lines that break upon activation of the inflator.

2. The airbag module of claim 1, wherein the inflator comprises an inflation gas dissemination portion that releases inflation gases upon activation of the inflator, and wherein the inflation gas dissemination portion of the inflator is located inside the airbag cushion.

3. The airbag module of claim 1, wherein airbag cushion comprises a mouth for receiving the portion of the inflator that is located inside the airbag cushion, and wherein the mouth of the airbag cushion is substantially smaller than the diffuser panel.

4. The airbag module of claim 1, wherein only a single layer of the airbag cushion is spread across a first side of the diffuser panel.

5. The airbag module of claim 4, further comprising a housing that is attached to the diffuser, wherein a folded portion of the airbag cushion is situated between a second side of the diffuser panel and the housing.

6. The airbag module of claim 1, further comprising a mounting bracket that is attached to the inflator and that is attachable to a support structure in the vehicle.

7. The airbag module of claim 1, wherein the inflator is a disk inflator.

8. The airbag module of claim 1, wherein the inflator is a cylindrical inflator.

9. The airbag module of claim 1, wherein the shape of the diffuser panel conforms to the shape of a dashboard in the vehicle.

10. An airbag module for installation in a vehicle, comprising:
    an airbag cushion;
    a diffuser positioned inside the airbag cushion, the diffuser comprising a diffuser panel with a plurality of venting apertures disposed therein; and
    an inflator attached to the diffuser, wherein the inflator comprises an inflation gas dissemination portion that releases inflation gases upon activation of the inflator, and wherein the inflation gas dissemination portion of the inflator is located inside the airbag cushion, wherein the diffuser panel comprises a plurality of snap lines that break upon activation of the inflator.

11. The airbag module of claim 10, wherein only a single layer of the airbag cushion is spread across a first side of the diffuser panel.

12. The airbag module of claim 11, further comprising a housing that is attached to the diffuser, wherein a folded portion of the airbag cushion is situated between a second side of the diffuser panel and the housing.

13. The airbag module of claim 12, wherein the airbag cushion comprises a mouth for receiving the portion of the inflator that is located inside the airbag cushion, and wherein the mouth of the airbag cushion is substantially smaller than the diffuser panel.

14. The airbag module of claim 13, wherein the breaking of the snap lines enables the folded portion of the airbag cushion to exit the diffuser as the airbag cushion inflates.

15. The airbag module of claim 14, further comprising a mounting bracket that is attached to the inflator and that is attachable to a support structure in the vehicle.

16. The airbag module of claim 15, wherein the shape of the diffuser panel conforms to the shape of a dashboard in the vehicle.

17. The airbag module of claim 16, wherein the inflator is a disk inflator.

18. The airbag module of claim 16, wherein the inflator is a cylindrical inflator.

19. An airbag module for installation in a vehicle, comprising:
    an airbag cushion;
    a diffuser positioned inside the airbag cushion, the diffuser comprising a diffuser panel with a plurality of venting apertures disposed therein; and
    an inflator attached to the diffuser, wherein the inflator comprises an inflation gas dissemination portion that releases inflation gases into the airbag cushion upon activation of the inflator, and wherein the line of gas flow between the inflation gas dissemination portion of the inflator and the airbag cushion does not include an attachment joint, wherein the diffuser panel comprises a plurality of snap lines that break upon activation of the inflator.

20. The airbag module of claim 19, wherein the airbag cushion comprises a mouth for receiving the portion of the inflator that is located inside the airbag cushion, and wherein the mouth of the airbag cushion is substantially smaller than the diffuser panel.

21. The airbag module of claim 19, wherein only a single layer of the airbag cushion is spread across a first side of the diffuser panel.

22. The airbag module of claim 21, further comprising a housing that is attached to the diffuser, wherein a folded portion of the airbag cushion is situated between a second side of the diffuser panel and the housing.

23. An airbag module for installation in a vehicle, comprising:

an airbag cushion having a mouth;

a diffuser positioned inside the airbag cushion, the diffuser comprising a diffuser panel with a plurality of venting apertures disposed therein and an inflator chamber attached to a bottom side of the diffuser panel, wherein the inflator chamber comprises an inflator hole that is substantially aligned with the mouth of the airbag cushion; and an inflator attached to the diffuser, wherein the inflator comprises an inflation gas dissemination portion that releases inflation gases upon activation of the inflator, and wherein the inflator extends through the mouth of the airbag cushion and the inflator hole in the inflator chamber so that the inflation gas dissemination portion of the inflator is located inside the airbag cushion, wherein the diffuser panel comprises a plurality of snap lines that break upon activation of the inflator.

24. The airbag module of claim 23, wherein the mouth of the airbag cushion is substantially smaller than the diffuser panel.

25. The airbag module of claim 23, wherein only a single layer of the airbag cushion is spread across a top side of the diffuser panel.

26. The airbag module of claim 25, further comprising a housing that is attached to the diffuser, wherein a folded portion of the airbag cushion is situated between the bottom side of the diffuser panel and the housing.

27. An airbag module for installation in a vehicle, comprising:

an airbag cushion;

a diffuser positioned inside the airbag cushion, the diffuser comprising a diffuser panel with a plurality of venting apertures disposed therein;

an inflator having an inflation gas dissemination portion that releases inflation gases in response to activation of the inflator; and means for attaching the inflator to the diffuser so that the inflation gas dissemination portion of the inflator is located inside the airbag cushion, wherein the diffuser panel comprises a plurality of snap lines that break upon activation of the inflator.

28. The airbag module of claim 27, wherein only a single layer of the airbag cushion is spread across a top side of the diffuser panel, and further comprising means for retaining a folded portion of the airbag cushion between the diffuser and a housing.

29. The airbag module of claim 28, further comprising means for permitting the folded portion of the airbag cushion to exit the diffuser as the airbag cushion inflates.

30. The airbag module of claim 27, further comprising means for attaching the inflator to a support structure in the vehicle.

* * * * *